May 22, 1956 H. L. HARTMAN 2,746,306

PLURAL-SPEED DRIVE MECHANISMS FOR PHONOGRAPH TURNTABLES

Filed Sept. 22, 1949 4 Sheets-Sheet 1

INVENTOR,
Herbert L. Hartman
BY Slough + Slough
His Attorneys

PLURAL-SPEED DRIVE MECHANISMS FOR PHONOGRAPH TURNTABLES

Filed Sept. 22, 1949 4 Sheets-Sheet 2

INVENTOR,
BY Herbert L. Hartman
Slough & Slough
His Attorneys

PLURAL-SPEED DRIVE MECHANISMS FOR PHONOGRAPH TURNTABLES

Filed Sept. 22, 1949

INVENTOR,
Herbert L. Hartman
BY Slough & Slough
His Attorneys

PLURAL-SPEED DRIVE MECHANISMS FOR PHONOGRAPH TURNTABLES

Filed Sept. 22, 1949 4 Sheets-Sheet 4

Herbert L. Hartman,
INVENTOR.
BY Slough + Slough,
His Attorneys.

2,746,306
Patented May 22, 1956

1

2,746,306

PLURAL-SPEED DRIVE MECHANISMS FOR PHONOGRAPH TURNTABLES

Herbert L. Hartman, Elyria, Ohio, assignor to The General Industries Company, Elyria, Ohio, a corporation of Ohio Application September 22, 1949, Serial No. 117,132

12 Claims. (Cl. 74—199)

My invention relates to a plural-speed drive mechanism for frictionally driving a phonograph turntable at any selected one of three different speeds, and relates more particularly to a novel mechanism wherein driving torque from a motor shaft of the mechanism may be frictionally communicated from said shaft to a final drive wheel through an interposed stepped friction pulley by selectively disposing said wheel in peripheral engagement with one or the other of three steps of said friction pulley which are of respectively different diameters, whereby an element of the turntable such as a pendant peripheral flange thereof may be frictionally driven by said wheel at any of a plurality, such as three predetermined rotational speeds.

With respect to one important phase of my invention, by virtue of the provision of a stepped idler pulley driven by the said motor shaft and providing adjustment means whereby the rubber rim of the final drive wheel may be selectively engaged with any one of three steps of a said idler pulley, not only may the drive pulley portion of the motor shaft be of increased diameter, as compared so that of said prior construction, but the steps of said idler pulley may then be of substantially greater diameters than said drive pulley.

My invention, moreover, relates to a novel construction of means provided for relatively adjusting the mechanism so as to selectively dispose said wheel in peripheral frictional engagement with any of the said plurality of idler pulley steps as will be hereinafter more completely explained.

Objects of my invention therefore are as follows:

To provide an improved frictional drive transmission mechanism adapted to be selectively adjusted in an improved manner for the driving of said turntable at any of a plurality, such as three, predetermined relative speeds.

To provide an improved mechanism of the above type by the provision of an idler drive pulley having a pulley portion adapted for frictional driving by the motor shaft at a rotative speed which is substantially less than that of said shaft and having a plurality of other pulley portions which are of different predetermined diameters and to peripherally effect selective, peripheral, light-pressure engagement between the final drive wheel of the mechanism, by which the turntable is frictionally driven, and any one of said pulley steps in a simple, efficient, expeditious manner.

To provide an improved manually operable selective adjustment mechanism for the multi-speed drive mechanism, whereby different turntable speeds may be achieved by manually effected adjustment movements of a handle, or control member which is solely movable in a path of uniform directional nature throughout.

To provide improved adjustment means adapted to selectively adjust the relative vertical position of the rim of a final drive wheel of the plural-speed drive mechanism with respect to different of a plurality of pulley steps of progressively increased diameters in a most convenient and expeditious manner.

2

To achieve each and every of the foregoing and other objects of my invention wherein the pressure of engagement between each pair of a series of peripherally engaged pulley elements is separately predetermined solely by the resilient effort of a spring.

To achieve each and all of the foregoing objects in a mechanism which contains a minimum of simple positively operating parts and which mechanism may be economically manufactured in quantity production.

will be more apparent to those skilled in the art to which

Other objects of my invention and the invention itself my invention appertains in the accompanying drawings illustrating a preferred one of many possible embodiments of my invention and to the descriptive specification which relates to the said embodiment and in which reference is made to the said drawings, wherein:

Fig. 1 is a top plan view of an embodiment of my invention shown as removably secured by sound-insulating grommets to a platform which affords a journal mount for a phonograph turntable supporting post, a fragment of a peripheral flange of the turntable being shown in horizontal transverse sectional view and a portion of the final drive wheel being shown as broken away so as to better afford a view of certain underlying parts of the mechanism, said mechanism being shown as adjusted for driving a turntable at a relatively highest rotative speed.

Fig. 2 is a somewhat abbreviated view of the same character of Fig. 1 but with the final drive wheel removed and other parts being shown as broken away, the parts being shown as adjusted to effect driving of the turntable by the final drive wheel which is merely indicated by a dotted circular line indicating the position of its periphery, the parts being shown as adjusted to drive the turntable at a relatively medium rotational speed.

Figure 6:
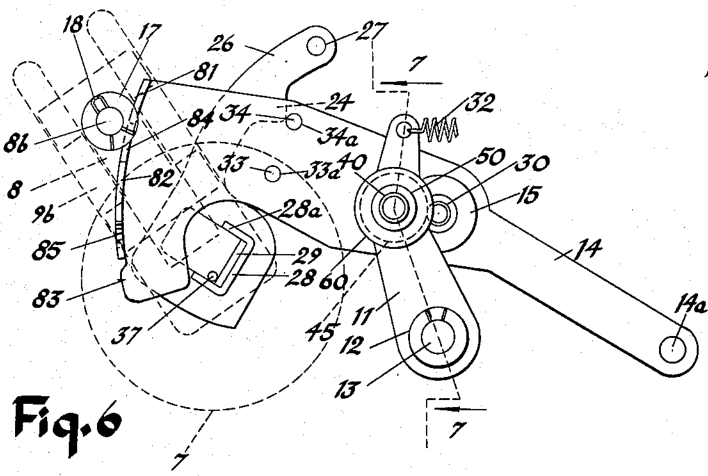

Fig. 6 is a top plan view of certain parts of the manually operable speed selecting mechanism of the foregoing figure, the parts being shown in their relative positions of adjustment which they momentarily assume at a preliminary stage of selectively changing the adjustment of said idler wheel from peripheral engagement with one of the idler pulley steps to another said step and more particularly at a time when the wheel is moved laterally byeond the lateral extent of any of said steps.

Figure 7:
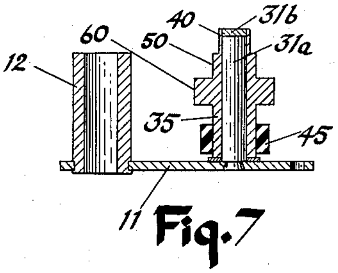

Fig. 7 is a vertical sectional view taken on the line 7—7 of Fig. 6.

Figure 8:
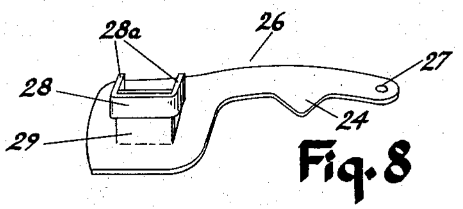

Fig. 8 is of the general nature of a perspective view of a level adapted to effect lateral shifting of the wheel at the said early stage of a speed adjustment change referred to in connection with Fig. 6.

Figures 9, 10, 12, 13:
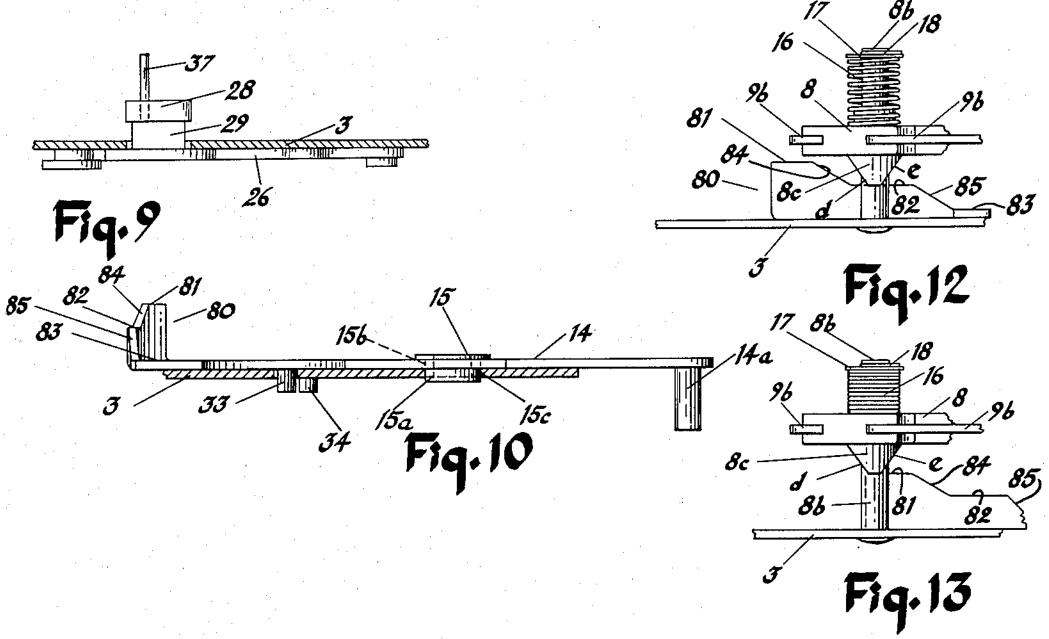

Fig. 9 is a side elevational view of the lever of Fig. 8 together with a superposed fragment of the common mounting plate of the mechanism which plate is shown in vertical section together with a pivot screw at the bottom left side of the figure upon which the lever of Fig. 8 is journalled and a supporting guide screw shown at the left bottom side of said plate, the upper part of the figure showing a fragment of a pendant pin which is rigidly secured to a slide element affording a support for the final drive idler wheel.

Fig. 10 is a side elevational view of the manually operable speed selecting adjustment lever of the mechanism.

Figure 11:
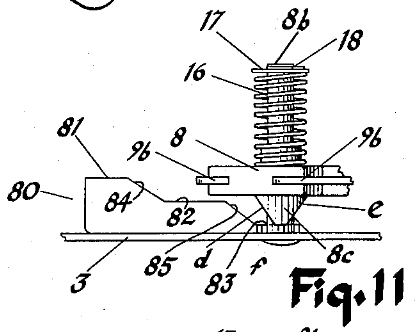

Fig. 11 is a side elevational view of a carrier for the final drive wheel together with a camming end portion of the lever of Fig. 10, the view showing the relative positions of said carrier and cam when the parts are adjusted to drive the turntable at the aforesaid highest speeds.

Figs. 12 and 13 are respective views similar to that of Fig. 11 but showing the said parts in their relative assumed positions for respectively effecting driving of the turntable at the medium and the lowest speeds.

Figures 1, 2:
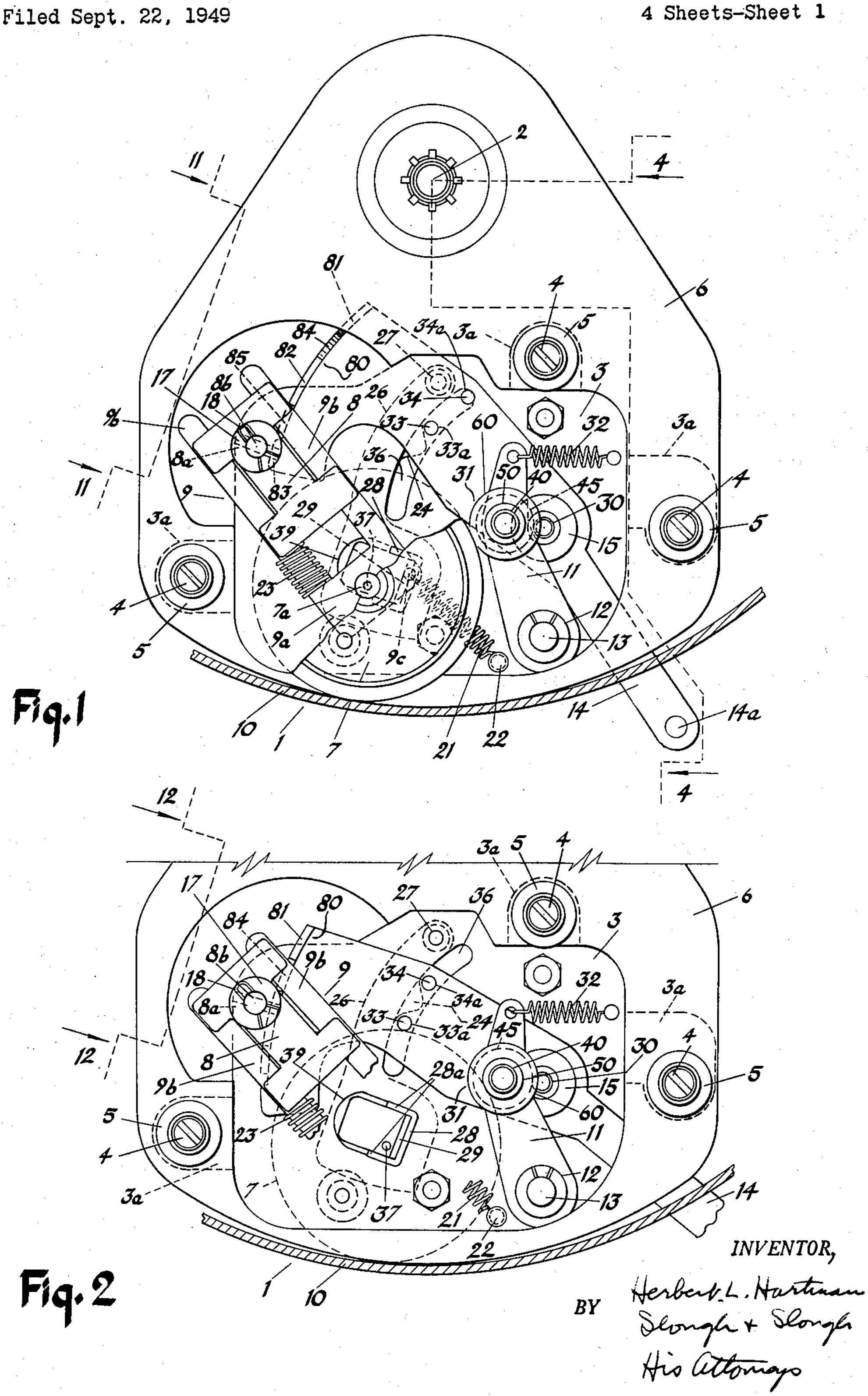
Figure 14:
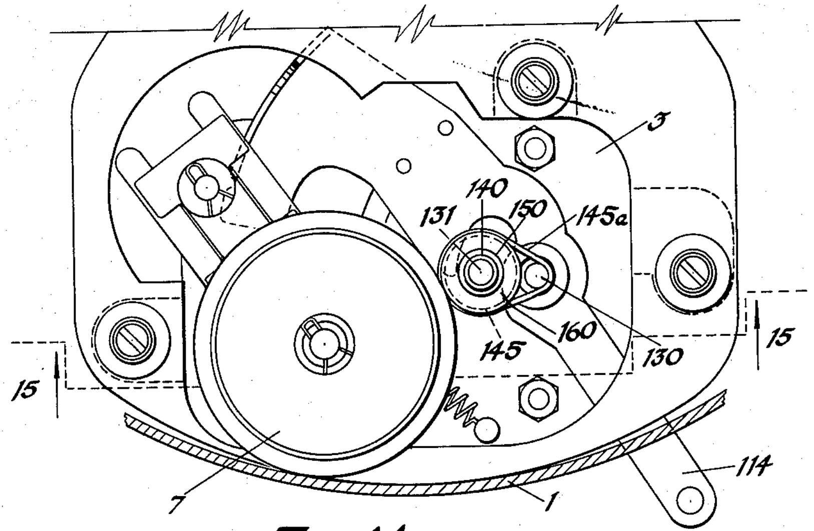
Figure 15:
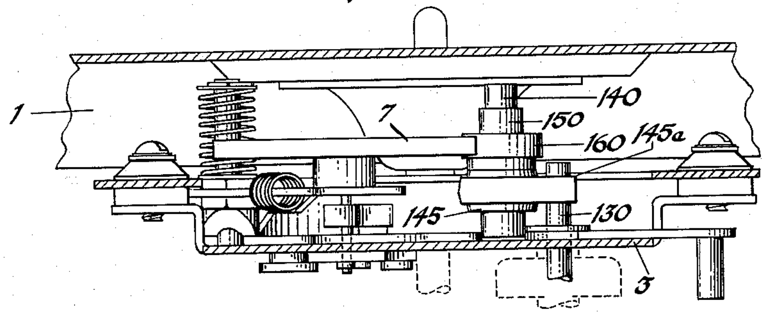
Figure 16:
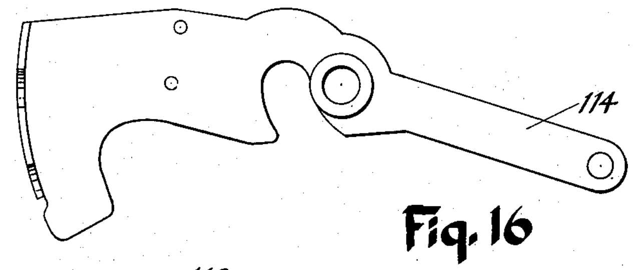
Figure 17:
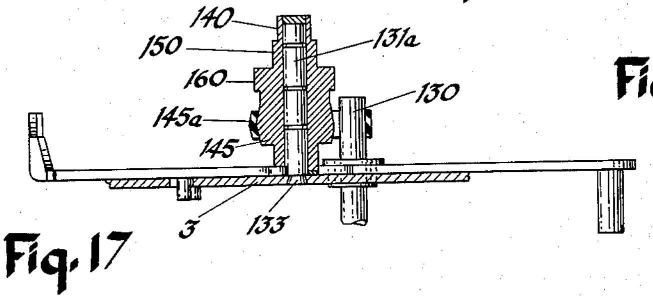
Figure 18:
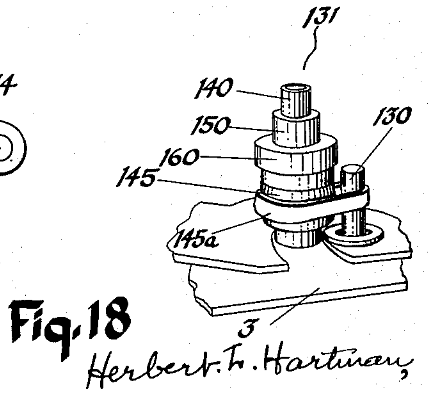

Figs. 14 to 18 inclusive illustrate a modification, wherein a stepped idler pulley is adapted to be belt driven, wherein Fig. 14 shows the motor drive shaft idler pulley and idler wheel in adjustment positions corresponding to that shown for the first embodiment in Fig. 1;

Fig. 15 shows the modified mechanism of Fig. 14 in side elevational view;

Fig. 16 shows the manually operable controlling lever in top plan view;

Fig. 17 shows the lever of Fig. 16, together with other parts, the motor drive shaft, idler pulley and belt involving the said modification, illustrated partly in side elevation and partly in vertical cross-sectional view;

Fig. 18 is a perspective view of the stepped idler pulley, motor drive shaft and belt in association with the lever of Fig. 16.

Referring now to the drawings which illustrate a presently preferred embodiment of my invention and a modification thereof, and in the different figures of which, like parts are designated by like reference characters, the improved drive mechanism comprises a mounting plate 3 which unitarily carries all parts of the mechanism, and which plate comprises a plurality of apertured flanges 3*a* by which, through the use of screws 4 and rubber sound-insulating grommets 5, the plate 3 may be adapted to be removably secured in pendant sound-insulated relation to a metal platform plate 6.

The plate 6 affords a journal support 2 for a phonograph turntable 1 which has a peripheral pendant annular flange, and a final drive wheel 7 of the mechanism is so disposed on the plate 3, that when the plate 3 is pendantly secured to the plate 6, the rim of said wheel is adapted for peripheral engagement with the inner surface of said flange 10 as best shown in Fig. 1 for frictionally driving said turntable.

Figure 4:
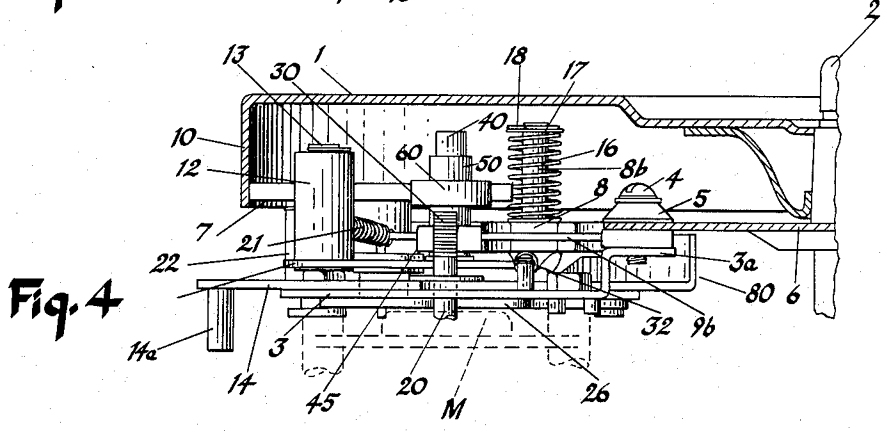
Fig. 4 is a view mostly in side elevation some parts being shown in vertical section of the apparatus as adjusted in Fig. 1, the view being taken as from the vertical line of section 4—4 of Fig. 1.
Figure 5:
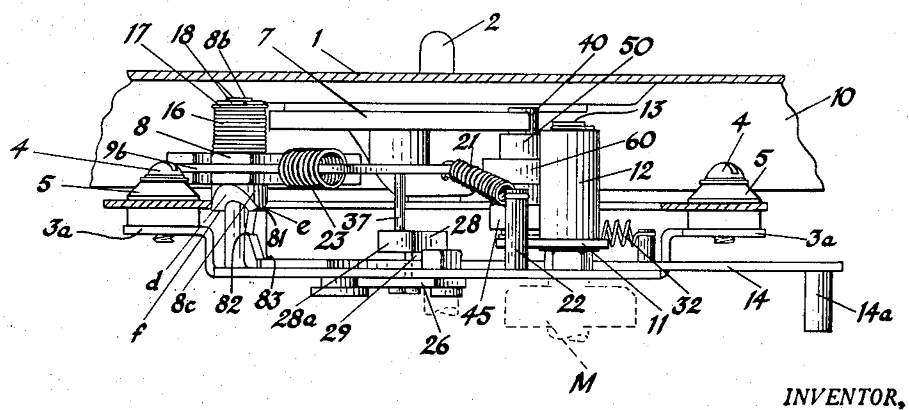
Fig. 5 is a view partly in elevation and partly in vertical section on the line of section 5—5 of Fig. 3.

A motor M is pendantly supported by the pate 3, being only fragmentally indicated in Figs. 4 and 5, in a usual manner, with its shaft 20 projecting vertically upwardly through an aperture of the plate 3, an upper portion of said shaft being provided with a pulley portion 30, said pulley surface being conveniently afforded by placement of a spring-steel closed helix rigidly telescoped over the said shaft upper portion.

A stepped idler pulley element 31, having pulley steps 60, 50 and 40 disposed progressively upwardly in coaxial relation, is in the first disclosed embodiment also provided with a cylindrical outer surface 35 which affords a seat for an annular rubber pulley 45, whose outer surface is adapted for frictional engagement with said pulley surface 30 of the motor shaft, and since the diameter of said shaft pulley portion 30 is preferably very much less than the diameter of the rubber pulley 45, the pulley element 31 will be driven by the drive pulley 30 at a rotative speed which is much less than that of the motor shaft.

Therefore, since the three steps 60, 50 and 40 of said element 31 are rotated at a relatively low rate of speed, to frictionally drive the wheel 7 at desired different rotative speeds by the effect of peripheral engagement by the rim of said wheel with different of said steps, these may be made of substantially greater diameters than would be the case of steps formed directly upon the motor shaft pulley and selectively engaged with said wheel rim, and therefore such larger steps will make a more effective frictional engagement with said wheel rim as a result of the lowered rotative speeds and of the greater pulley step diameters here employed.

The pulley 31 is provided with an axial bore, the upper end thereof being closed by a solder plug 31*b* and said pulley is thus telescopable over a journal post 31*a* for the rotation about the vertical axis of said post.

The post 31*a* is rigidly secured by riveting its lower end to a lever 11, a tubular upstanding hub 12 for said lever being also secured by its lower end to another portion of the lever, whereby the lever is adapted to be journalled by its said hub on a post 13 whose lower end is also riveted to the frame plate 3; the lever 11 is thus swingable about the axis of said post 13 to swing said idler pulley element 31 to and from a position where its rubber pulley 45 is peripherally frictionally engaged with the drive pulley 30 of the motor shaft; said lever is, however, preferably continuously biased to a position wherein said pulley 45 is frictionally engaged with said drive pulley 30, by virtue of a spring 32 which is secured by one end to a swingable portion of said lever, and the other end of the spring is extended to secure it to the frame 3, whereby light pressure engagement of said pulley 45 with the drive shaft pulley 30 is ensured.

The wheel 7 is journalled upon an upstanding post 7*a*, Fig. 1, which in turn is carried by the web portion 9*a* of a U-shaped slide 9 having parallel laterally interspaced slide arms 9*b* which slidingly fit in lateral grooves of a swingable slide carrier 8, whose hub 8*a* is telescoped over, and is journalled upon a vertical post 8*b*, whose lower end is rigidly secured to the frame plate 3. The post 8*b* is vertically more elongated than said carrier hub so that the carrier may be substantially elevated or lowered on said post.

The said hub extends downwardly from the body 8 of the carrier by a portion 8*c*, the lower end of which being so formed as to provide a cam follower having lateral surfaces *d* and *e*, and a lowermost surface *f*, as best shown in Figs. 5, 11, 12 and 13.

A cam is afforded by a flange 80 of the hand lever 14, having a handle 14*a*, and which is journalled for swinging about the axis of a tubular flange 15*a* of a radially flanged tubular element 15, the tubular flange 15*a* being projected through an aperture 15*b* of said lever 14 and the lower end of said tubular flange 15*a* being driven by a drive fit through an aperture 15*c* of the supporting plate 3 whereby the uppermost radial flange of said thimble 15 overlies the lever 14 and said lever is adapted to be journalled on the exterior surface of said tubular flange.

The motor shaft 20 projects upwardly through the tubular bore of the thimble 15 and since the motor M is rigidly supported by the plate 3, said lever is swingable about the axis of said shaft on the flange 15*a* of said thimble. The cam afforded by the flange 80, at the free swung end of said lever, is provided with successive lands, the one at 81 being uppermost, a second at 82 being disposed intermediately of the land 81 and the lowermost land 83.

Inclined camming edge surfaces 84 and 85 of said flange 80, are respectively disposed between the land surfaces 81 and 82, and the lands 82 and 83 of the cam. Figs. 11, 12 and 13 respectively show the pendant cam follower portion 8*c* of the wheel carrier 8 respectively engaged by its lowermost and downwardly facing surface *f*, with the lands 83, 82 and 81, respectively.

The successive positioning of said carrier 8 being the result of swinging movement of the lever 14 to move the flange as viewed in said figures to successively different positions toward the right, whereby the carrier 8 is lifted to successively higher levels by the effect of the cam follower surface of the carrier engaging cam surface 85 and 84 engaging the pendant cam follower 8*c* as the lever 14 is swung in the counterclockwise direction about its swinging axis.

A compression spring 16 is interposed between an upper surface of the carrier 8 and a washer 17 which is maintained in place by a hairpin retainer 18 near the end of the post 8*b* and therefore yieldably opposes upward movement of the carrier and is effective to restore the carrier to any lower position in response to movement of the cam 80 which is effective to substitute a relatively lower cam land 82 or 83 for engagement by the lowermost surface *f*, of said carrier.

Since the wheel 7 is carried by the web portion 9*a* of the slide 9, the wheel 7 is adjustable to three different elevations, of which the uppermost, wherein the wheel rim is disposed at the level of the uppermost pulley portion 40 of the idler pulley 31, is best shown in Fig. 5; and the lowermost, with the wheel rim at the level of the lowermost pulley portion 60, is best shown in Fig. 4. Fig. 2 shows the relative positioning of the parts when the wheel is adjusted to the intermediate level of the intermediate pulley step 50, by swinging of the lever 14 to that operative position wherein the cam-follower portion 8*c* of the carrier 8 rests upon the intermediate cam land 82.

The wheel 7 is biased toward a lateral position wherein its rim is brought int peripheral engagement with any one of the pulley steps 40, 50 or 60 to whose level the wheel is positioned, by the resilient effect of a pair of springs 21 and 23, whereof the spring 21 is extended to interconnect a fixed post 22 with a perforated corner 9*c* of the slide web 9*a*, and the other spring 23 is compressibly disposed between the said slide web and a forward edge of the carrier 8, being conveniently telescoped over a slide arm 9*b* of the slide 9, and adapted to bias said slide toward fully extended position.

The spring 23 is optionally dispensible, since in such case, the spring 21 may be caused to exert a somewhat greater pull upon the slide to directively bias the wheel so as to provide a predetermined sufficient degree of pressure as between said wheel rim and a selected pulley step and concurrently between said rim and the inner surface of the pendant flange, such as that at 10, for a turntable as at 1, to the supporting platform 6 of which the frame 3 of the unitary mechanism of my invention may be removably secured by the screws 4, and grommets 5.

Figure 3:
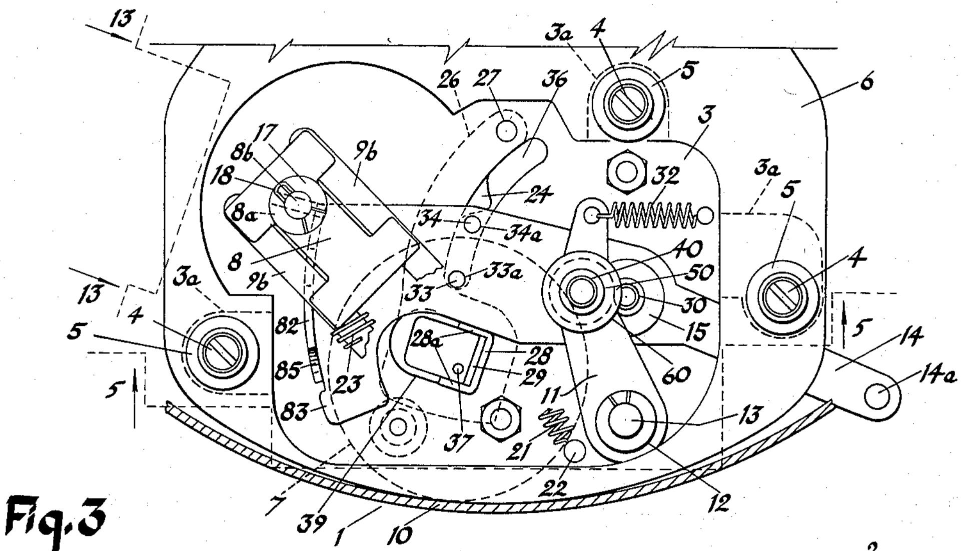
Fig. 3 is a view of the nature of that of Fig. 2 but showing the parts adjusted for driving of the turntable at a relatively slowest speed.

When the lever 14 is manually swung, by movement of its handle in a uniformly arcuate path to the different operative positions comparatively shown in Figs. 3, 2 and 1, to respectively adjust the wheel rim from one level of a pre-engaged one of the idler pulley steps 40, 50 and 60, to the level of a different one of said steps, means are provided to initially move the wheel n an outward lateral direction beyond the periphery of the pulley 60 which is of greatest diameter.

Such means comprise the pull-out lever 26, shown in Fig. 8, having a cam-follower projection 24, and U-shaped projection 28 and co-operating cam posts 33 and 34 which are pendantly supported by the hand lever 14, said posts having upper ends riveted into the respective apertures 33*a* and 34*a* of said hand lever, the posts being extended downwardly from said lever through the arcuate opening 36 of the plate 3 and projecting below said plate.

The lever 26 is pivoted on a pin anchored in the plate 3, and passed through the aperture 27 at one end of the lever, the upstanding U-shaped pull-out projection 28 being projected, by its stem 29, upwardly through an elongated opening 39 of said plate 3 and said stem being swingable with its associated lever end longitudinally of the opening.

A pin 37, being a downward projection of the journal post 7*a* for the wheel 7 is normally positioned between the lateral arms of the pull-out U-shaped member 28, whereby when the lever 26 is swung, the stem facing 29 of the pull-out member 28 moves to thrust the journal post pin 37 and thence the slide 9 upon which the wheel post 7*a* is mounted in a receding direction, in opposition to the springs 23 and 21, to momentarily recedingly move the wheel rim out of engagement with the pre-engaged step of the pulley 31, and to laterally displace it beyond the peripheral limits of the largest pulley step 60, thereof.

Such swinging "pull-out" movement of the lever 26 is effected, against the opposing resilient pull of the springs 21 and 23, by the camming engagement of the cam-follower projection 24 of the lever 26, by one or the other of the pendant pins 33 or 34 carried by the hand lever 14, during and responsive to, an initial portion of any swinging adjustment movement of said lever 14.

As shown by the drawings, one or the other of said pins is adapted to engage an inclined side of the lever projection 24 during the initial portion of the adjustment movement of said hand lever whenever the hand lever is moved from any of the three adjustment positions toward any other thereof, and said lever 26 with the thereby carried pull-out element 28 is restored by the springs 21 and 23, responsive to the final portion of any adjustment movement of said lever 14 to a different adjustment position, wherein the cam-follower projection 24 is disengaged by the pre-engaging pin 33 or 34.

The rim of the wheel 7, therefore, following its said momentary outwardly directed lateral movement will be lowered or elevated to the different level of a different pulley step, in response to manually effected continued movement of said cam flange 80, in either direction.

Fig. 6 shows the lever 26 in its laterally swung position, effected by camming engagement of the cam projection, this view omitting the mounting frame plate 3, and is mainly for the purpose of showing the levers 14 and 26 and the parts carried thereby in the wheel "pull-out" condition of adjustment, the wheel 7, the slide 9, and the mount 8 being indicated in the positions they assume while said condition prevails.

In the described positioning of the pendant pin extension 37 of the wheel post 7*a* to position it between the side arms 28*a* of the U-shaped piece 28 which is preferably welded by the inner face of its web to the upturned tongue 29 of the lever 26, permissible swinging movement of the wheel supporting carrier 8 about its post 8*b* is restricted since the springs 21 and 23 maintain said pin extension 37 at all times between said arms 28*a* and the inwardly facing surface of the supporting tongue 29 and said pin 37 cannot move laterally except between said arms 28*a*, this limitation upon the swinging movement of the carrier 8 being desirable in order to prevent an undue rotational movement of the pendant portion 8*c* of the carrier whose lower end *f* is engaged by the inclined cam portions 84 and 85 of the uppermost camming edge of the lever flange 80, which cam portions might otherwise effect a swinging effort upon said carrier.

From the foregoing description it will be understood that the ratio between the diameters of the drive pulley 30 and the driven rubber pulley 45 is such that with the shaft 20 being rotatable by the small size motor at the usual relatively high rotational speed, that with the diameters of the pulley portions 40, 50 and 60 of the idler pulley 31 being proportionately correctly graduated, the peripheral surfaces of said stepped pulley portion will rotate at substantially the three different desired peripheral speeds at which the turntable flange 10 is to be driven in order that the turntable, having such flange, may respectively rotate at desired speeds, such as 33⅓ R. P. M., 45 R. P. M., and 78 R. P. M. when said wheel 7 is peripherally engaged with the inner surface of said flange 10 and concurrently with the respective pulleys 40, 50 and 60 of said pulley element 31 by means of the selective adjustment means comprising the lever 14 and the parts operatively associated therewith and adjusted thereby as described; within the scope of my invention by changing the diameters of the different pulley parts, other rotational speeds of the turntable may be achieved as is well-known to those skilled in the art. It is important that one of each pair of relatively engaged driving and driven pulleys should be laterally movable and the pressure of engagement between said pair of pulleys should be achieved by such spring means as the spring 32 for the pulley 31 and the spring or springs 21 and/or 23 for the drive wheel 7, as distinguished from prior friction gearing wherein each of two paired relatively driving and driven pulleys are fixedly mounted on rigidly maintained parallel journal posts or axles particularly where the gearing is powered by a very small motor and the pulley parts themselves are quite small as here shown, and where alternate of said pulley parts are provided with rubber rings or facings.

Attention is directed to the fact that an operator adjusting the mechanism by swinging the handle 14 should be apprized by the action of the handle whenever the handle has been moved to an operating position wherein the idler wheel rim is in engagement with a selected one of the idler pulley steps 40, 50 or 60. In the present embodiment this knowledge is conveyed to the operator by the fact that during each adjustment movement of the handle 14*a*, a maximum of pressure must be applied to the handle to shift it from one operative position to the next operative succeeding position, this being occasioned by the fact that when the handle is in a first position of adjustment, as viewed in Fig. 1, and the rim of the wheel 7 is engaged with the lowermost roller 60, the two pins 33 and 34 are confined in a space between one end of the arcuate slot 36 so that movement in any direction from the adjusted position of the lever 14 is resisted either by the pin 33 coming into engagement with the cam-follower 24 or with the end edge of the arcuate opening 36 through the frame plate 3; in a second position of adjustment wherein the periphery of the wheel 7 is engaged with the intermediate idler pulley step 50, the two pins 33 and 34 are disposed closely at the two sides of said cam-follower 24 which notably resists movement of the swingable lever 14 from such position; whereas, in the third position of adjustment illustrated in Fig. 3, the situation with respect to said pins both being disposed between the cam projection 24 and an end edge of the arcuate aperture 36 is repeated as in the first position of adjustment, except that said pins are at the opposite side of said projection 24.

It will be understood that the function of the pull-out mechanism for moving the wheel 7 laterally prior to vertical adjustment movement of the wheel to a different level and thereafter during such movement, is to prevent interference with such vertical movement with the rim of said wheel making engagement with the step pulley, and with respect to downward movements of the wheel, such interference would prevent the wheel from moving downwardly.

In the foregoing description and by the accompanying drawings, I have disclosed an embodiment of my invention, whereby a stepped idler pulley 31 having a series of superposed successively smaller diameters, proceeding upwardly, and wherein all of said diameters are greater than could practically be the case if the stepped pulley portions were formed upon or carried directly by the motor shaft 20, and therefore, a more efficient transmission of rotary movement may be effected from the stepped pulley to the final drive wheel rim without increasing, but preferably decreasing, the tension of any such spring or springs as at 21 and 23, which determine the pressure of peripheral engagement as between said pulley steps and said wheel rim, and also between said rim and the inner annular surface of any turntable flange as at 10, with which said wheel rim is engaged, whenever the drive mechanism is unitarily secured, as by the grommet screws 4, passed through the usual set of three properly located openings of the plate on platform 6, which supports the rotatable turntable post 2.

So placed, the unitary mechanism is adapted to cause the wheel 7 to be inwardly laterally deflected against the pressure of the springs 21 and 23, which determine the degree of pressure of engagement by the wheel rim and the turntable flange 10.

The presently described embodiment of my invention involves a rubber or like rim for the wheel 7 and a rubber facing pulley 45 which is engaged with the metallic motor shaft pulley 30 by a pressure at all times predetermined by the spring 32. Such rubber facings as provided for the alternate of a series of serially related peripherally engaged friction pulley elements results in increased efficiency of power transmission without imposing considerable pressure upon the driving and driven pulley portions, and at the same time, the rubber or corresponding material being in the line of drive, affords a sound insulator between metallic pulley parts to prevent noises originating in said metallic parts, as by the motor, or by bearings of said pulleys, from being transmitted therefrom to the metallic turntable flange 10. Otherwise, such noises would be transmitted through interengaged pulley parts to an associated turntable and thence, to a phonograph disc record placed upon the upper surface of such turntable as at 1.

Referring now to the second embodiment of my invention illustrated in Figs. 14 to 18 inclusive, which consists of a modification from the above first described embodiment, the said modification mainly consists of substituting an elastic belt 145*a*, and a crowned metallic lowermost pulley step 145 of the step pulley 131, for the annular rubber pulley 45 of the first embodiment, and as distinguished from the first embodiment, disposing the stepped pulley 131 in such laterally interspaced relation to the motor shaft 130 that none of the steps of said pulley 131 will be directly engaged with said shaft; both embodiments except for illustrating different means for rotating a stepped drive pulley in response to rotation of the motor shaft, are substantially duplicates in so far as the improved means for vertically and laterally adjusting the final drive wheel 7 with respect to the different pulley portions of said drive pulley.

However, as best shown in Figs. 16 and 18 at 132 the controlling lever 114 is inwardly slotted so that the journal post 131*a* for said pulley may be preferably rigidly anchored by its lower end, at 133, on the main supporting plate 3 of the mechanism and the lever 114 is thus adapted to be swung about the axis of the motor shaft 130 as before.

The pulley 131 is provided with a series of three pulley steps 140, 150, and 160, of progressively increased diameters proceeding downwardly from the pulley, these pulley steps being adapted as before for peripheral engagement by the rim of the wheel 7.

The other parts of the mechanism preferably remain unchanged from that disclosed in connection with the foregoing embodiment except that it may be stated that the lever 11, the cylindrical element 12, the post 13, and the spring 32 is not employed in the modified form of the invention of Figs. 14 to 18 inclusive, any such additional spring to ensure the proper degree of pressure between the elements affording transmission of rotary motion from the shaft 130 to the pulley 131, being rendered unnecessary where an elastic belt 145*a*, as described, is employed. The operation of the mechanism, otherwise, is preferably the same as herein above disclosed for the said first embodiment.

I am aware that numerous and extensive departures may be made from the described and illustrated construction of the presently disclosed embodiment of my invention, but without departing, however, from the spirit of my invention.

I claim:

1. A three-speed drive mechanism for phonograph turntables comprising a motor driven shaft, a stepped idler pulley affording a set of relatively superposed pulley portions of successively different diameters and having another pulley portion peripherally frictionally engageable with said shaft, a final drive wheel having a friction rim selectively disposable at the different levels of the pulley portions of said set, spring means adapted to cause said rim to engage with that one of said set of pulley portions at whose level said rim is disposed, an adjustment member having a handle portion adapted for station-to-station movement from any, to any other of three stations disposed in interspaced relation in a path of uniform directional nature throughout, and wheel moving means operable by said member, adapted to respond successively to an initial portion, an intermediate portion and a concluding portion of said station-to-station movement of said handle, to successively laterally separate said wheel rim from a pre-engaged one of said pulley portions, shift said rim to the different level of a desired selected different one of said pulley portions, and then to release said wheel at said different level, whereby said spring means is adapted, in response to release of said wheel by said moving means, to laterally return said wheel rim in an opposite direction of movement, to peripheral spring-pressed engagement with the selected pulley portion.

2. A plural-speed drive mechanism for phonograph turntables comprising a motor shaft, a stepped idler pulley affording a series of relatively superposed pulley portions of successively different diameters and having another pulley portion frictionally engageable with said shaft, a laterally movable support affording a journal upon which said idler pulley is rotatable, a final drive wheel having a friction rim disposable at different levels in spring pressed engagement with any of said series of pulley portions, a laterally and vertically movable mount affording a journal upon which said wheel is rotatable, said shaft, wheel, and pulley being rotatable upon parallel substantially vertical axes, spring means laterally biasing said support and said mount to respectively effect resiliently induced pressure engagement between said shaft and the shaft engageable idler wheel portion and also between the friction rim of said wheel and any one of said series of idler pulley portions at the level of which said rim may be disposed, an adjustment member having a handle portion adapted for station-to-station movement from any, to any other of three stations disposed in interspaced relation in a path of uniform directional nature throughout, and means operable by said member, responsive respectively to an initial portion, an intermediate portion, and a concluding portion, of said station-to-station movement of said handle adapted to overpower the pressure of said mount-biasing spring means to respectively successively laterally separate said wheel rim from a pre-engaged one of said pulley portions, shift said rim to the different level of a different one of said pulley portions, and finally release said wheel at said different level to restore said wheel support to the sole control of said spring means whereby said wheel rim is resiliently laterally pressed by said spring means into frictional engagement with another pulley portion of said idler pulley which is selectively determined by said manual movement of said handle to a particular station in its path of movement.

3. A unitary selective three-speed drive mechanism for phonograph turntables comprising a frame supporting all parts of said mechanism, said parts comprising a motor having an upwardly directed drive shaft whose upper portion is suitably formed to afford a drive pulley, a friction wheel having a friction rim adapted to be laterally engaged with an annular element of a turntable, a laterally movable mount for said wheel, said mount being also movable upwardly and downwardly to dispose said wheel in different lateral positions at any of three different levels, an idler pulley formed to provide a set of three co-axial pulley portions of respectively different diameters with each said portion being respectively disposed at different of said levels, and said idler pulley having a fourth pulley portion of greater diameter than said drive pulley and being frictionally engageable therewith, a laterally movable mount for said idler pulley, and spring means respectively laterally constraining said wheel and idler pulley mounts as to laterally dispose the rim of said wheel in engagement with an idler pulley portion at whose level said rim is disposed, and to dispose said fourth pulley portion in peripheral engagement with said drive pulley, manually operable adjustment means for said wheel comprising a handle element which is selectively manually movable in a path of movement which is of uniform directional nature throughout from one to any other of three interspaced stations in said path, a first motion-transmitting means operable in response to a substantially initial portion of any station-to-station adjustment movement of said handle to laterally shift said wheel mount whereby the rim of said wheel is moved laterally outwardly from a pre-engaged pulley portion in opposition to the power of its associated spring means, and a second motion-transmitting means adapted in response to continuance of said station-to-station movement of said handle to effect a vertical movement of said laterally shifted wheel from its pre-adjusted level to the different level of a different one of said pulley portions, and means operable responsive to a concluding portion of said continued station-to-station movement of said handle adapted to disable the effect of said first motion-transmitting means, whereby said spring means for said wheel mount is adapted to laterally so move said mount as to dispose said wheel rim in spring-pressed peripheral engagement with the said different one of said pulley portions of said idler pulley.

4. In a plural speed friction drive mechanism of the type wherein all parts thereof are unitarily secured on a common frame which is adapted to be so interfitted with a turntable supporting platform as to effect frictional engagement of an inner annular surface of a turntable by the rim of a final drive friction wheel of the mechanism, comprising a motor shaft, an idler pulley, and a drive wheel, each of which are separately journalled for rotation on parallel axes, the journals of said pulley and wheel being respectively afforded by separate laterally movable pulley and wheel mounts, said pulley comprising a first pulley portion by which said pulley is driven by said shaft and an additional set of three pulley portions of relatively different diameters disposed in axially aligned successive different positions at three different levels, said wheel mount being adapted for vertical adjustment movement so as to dispose the rim of said wheel at the level of any of said set of idler pulley portions, a spring adapted to effect pressure engagement between the peripheries of said wheel rim and of that pulley portion of the set at the level of which said rim may be disposed, a manually operable adjustment member adapted to be moved from any one to any other of three interspaced stations located in a path of movement of continuously like directional nature throughout, motion transmission means operable responsive to any movement of said member from any one of said stations to any other thereof adapted to first laterally move said wheel so as to disengage its rim from a preengaged pulley portion of said set, and then to maintain said wheel in such disengaged position until said wheel has been moved by said member in either vertical direction to the level of a different pulley portion of said set, and means operable responsive to arrival of said member at said other station to disable said motion transmission means whereby said spring is adapted to effect spring pressed engagement of the rim of said wheel with the periphery of said different idler pulley portion.

5. In a plural speed friction drive mechanism of the type wherein all parts thereof are unitarily secured on a common frame which is adapted to be so interfitted with a turntable supporting platform as to effect frictional engagement of an inner annular surface of a turntable with a rim of a final drive friction wheel of the mechanism, comprising a motor shaft, an idler pulley and a drive wheel each of which being separately journalled for rotation on parallel axes, the journals of said pulley and wheel being respectively afforded by separate laterally movable pulley and wheel mounts, said pulley comprising a first pulley portion adapted to be constantly driven by said shaft and an additional set of three pulley portions of relatively different diameters disposed in axially aligned positions at three different levels, a manually operable adjustment member adapted to be selectively moved to any of three interspaced stations located in a path of movement of continuously like directional nature throughout, a pair of ancillary cam elements operable in response to station-to-station movements of said member, a spring continuously yieldingly exerting an effort tending to maintain said wheel rim in frictional engagement with one of the said set of pulley portions which is at the prevailing level of the said wheel rim, a first said element adapted for movement in response to a first portion of any station-to-station selective movement of said member to move said wheel horizontally to dispose its rim laterally outwardly from a pre-engaged pulley portion in opposition to the retractive effect of said spring, said second element adapted for movement responsive to continuance of said station-to-station movement of said member to shift said laterally disposed wheel to the different level of a different one of said set of pulley portions, and said first element adapted in response to the concluding portion of said station-to-station movement of said member to release said wheel for inward lateral movement, effected by the retractive effort of said spring, to cause said wheel rim to make spring-pressed engagement with that pulley portion at said different level.

6. In a plural speed friction drive mechanism of the type wherein all parts thereof are unitarily secured on a common frame which is adapted to be so interfitted with a turntable supporting platform as to frictionally engage an inner annular surface of a turntable by the rim of a final drive friction wheel of the mechanism, comprising a final drive wheel, a motor shaft, and an idler pulley, all of which being separately journalled for rotation on parallel axes, a laterally and vertically movable support affording a supporting journal for said wheel, said pulley comprising a first pulley portion by which said pulley is driven by said shaft and an additional set of three axially aligned pulley portions of differing diameters which are respectively disposed at three different levels, an adjustment member adapted to be moved between interspaced stations located in a path of movement of continuously like directional nature throughout, a first cam means adapted in response to said station-to-station movement of said member to vertically shift said wheel to dispose its rim at the level of a different of said pulley portions identified with the station to which said member is adjustably moved, a spring exerting a resilient laterally direct effort on said wheel tending to dispose the wheel rim inwardly to a position of peripheral engagement with one of said set of pulley portions at whose level said wheel rim is then disposed, a second adjustment cam means operable in response to an initial portion of each said station-to-station movement of said member to laterally shift said wheel rim laterally and outwardly from said position of engagement with one of said set of pulley portions in opposition to the oppositely directed effort of said spring, and said second cam means being disabled in response to concluding portion of each station-to-station movement of said member, whereby said wheel is restored to its operative lateral position, in peripheral engagement with said different pulley portion, by the said resilient effort of said spring.

7. In a drive mechanism applicable to frictional driving of a phonograph turntable at a plurality of different speeds comprising a final drive wheel adapted for frictional engagement with an annular peripheral flange of said turntable, comprising a stepped idler pulley, a motor shaft, and said final drive wheel, said wheel and pulley being journalled for rotation on different axes both parallel to that of said shaft, said pulley comprising an axially aligned set of pulley portions of different diameters and being located at different levels and also comprising another axially aligned pulley portion whereby said pulley is driven by said shaft, an adjustment means comprising a manually operable controlling handle movable in a path of uniform directional nature throughout to any selected one of a plurality of different stations in said path, said adjustment means being adapted to dispose the rim of said wheel in peripheral engagement with different ones of said set of pulley portions when said handle is moved to correspondingly different of said stations, and said adjustment means comprising means for preliminarily shifting said wheel laterally to disengage its rim from a pre-engaged one of said set of pulley portions until said rim is disposed at the desired different level of a different selected pulley portion of said set which is functionally related to the selected handle station, and spring means adapted to resiliently bias said wheel in a lateral direction wherein its rim is yieldably engaged with any of said set of idler pulley portions at whose level said wheel rim is located.

8. A plural speed frictional drive mechanism comprising a motor shaft, an idler pulley frictionally driven by said shaft, said pulley having a stepped upper end portion affording a set of different pulley portions of relatively different diameters, a final drive wheel having a non-sound conducting friction rim adapted for selective adjustment positioning to dispose said rim in peripheral frictional engagement with any of said set of pulley portions, a spring adapted to yieldably exert a resiliently applied effort tending to cause said wheel rim to be pressed against any adjacent pulley portion of said set, and an adjustment mechanism comprising a handle manually movable in a path of substantially uniform nature throughout, said mechanism adapted, when said handle is moved between an adjacent pair of a succession of stations progressively disposed at intervals in said path to successively effect a lateral movement of said wheel to laterally disengage its rim from a pre-engaged pulley portion of said set against the power of said spring, and then to shift said wheel axially to dispose its rim laterally adjacent to another pulley portion of said set, and finally to release said wheel for lateral movement of its rim in response to the effort of said spring to effect pressure engagement between said wheel rim and the said another pulley portion.

9. A plural speed frictional drive mechanism substantially as set in claim 8 characterized by said means for axially shifting said wheel rim comprising a cam element movable by said handle and a cam-follower element to communicate movement, from said cam element, to said wheel to move it axially.

10. A frictional drive for phonograph turntables comprising a motor, a stepped pulley adapted for rotation in response to operation of said motor, said element being formed to provide a set of relatively superposed pulley portions of successively different diameters, a final drive wheel having a non-sound conducting friction rim adapted for driving engagement with a flange of a turntable to drive the same, a movable mount for said wheel, said mount adapted for selective adjustment positioning to dispose said rim in peripheral frictional engagement with any of said set of pulley portions, a spring adapted to yieldably exert a resiliently applied effort on said mount tending to cause said wheel rim to be pressed against any laterally adjacent pulley portion of said set, and an adjustment mechanism comprising a control member movable in a path of substantially uniform nature throughout from any one to another of an adjacent pair of a plurality of stations successively disposed at intervals in said path, said mechanism comprising means adapted in response to any such movement of said member to effect lateral movement of said wheel mount in such direction as to cause the wheel rim to be laterally disengaged from a pre-engaged pulley portion of said set against the power of said spring, said mechanism also comprising relatively associated cam and cam follower elements, a first of said elements adapted, in response to each said movement of said member, to be moved in either of two directions according to the direction of movement of said member, the second of said elements adapted, in response to movements of said first element, to communicate an elevating or a lowering movement to said wheel mount in response to movement of said first element in either of respective of its different directions of movement to cause said wheel to be vertically shifted to such an extent as to dispose its rim laterally adjacent to that pulley portion of said set which corresponds to the adjusted station position of said member, and said means adapted for movement at the conclusion of each adjustment movement of said member, from any one of said stations to another thereof, to finally release said wheel mount to effect lateral movement of said wheel in response to the retractive effort of said spring to effect pressure engagement between said wheel rim and the last said pulley portion.

11. The drive mechanism, substantially as set forth in claim 10, characterized by the means for effecting lateral disengaging movement of the wheel rim, with respect to the pre-engaged pulley portion, comprising a lever adapted in response to each disposition of said member in any adjustment position other than at one or the other of said stations, to be swung from a normal position to an alternative position wherein it engages an element of said wheel and mount to effect lateral outward movement of the wheel rim from engagement with any of said pulley portions.

12. In a plural speed friction drive mechanism of the type wherein all parts thereof are unitarily secured on a common frame which is adapted to be so interfitted with a turntable supporting platform as to frictionally engage an inner annular surface of a turntable by the rim of a final drive friction wheel of the mechanism, comprising said final drive wheel, a motor, a stepped pulley adapted for rotation in response to operation of said motor, said wheel and pulley being separately journalled for rotation on parallel axes, a laterally and vertically movable support affording a supporting journal for said wheel, said pulley comprising a plurality of axially aligned pulley portions of differing diameters which are respectively disposed at three different levels, an adjustment member adapted to be moved between interspaced stations located in a path of movement of continuously like direction nature throughout, a first cam means adapted in response to said station-to-station movement of said member to vertically shift said wheel to dispose its rim at the level of a different of said pulley portions identified with the station to which said member is adjustably moved, a spring exerting a resilient laterally directed effort on said wheel tending to dispose the wheel rim inwardly to a position of peripheral engagement with one of said set of pulley portions at whose level said wheel rim is then disposed, a second adjustment cam means operable in response to an initial portion of each said station-to-station movement of said member to laterally shift said wheel rim laterally and outwardly from said position of engagement with one of said set of pulley portions in opposition to the oppositely directed effort of said spring, and said second cam means being disabled in response to concluding portion of each station-to-station movement of said member, whereby said wheel is restored to its operative lateral position, in peripheral engagement with said different pulley portion, by the said resilient effort of said spring.

References Cited in the file of this patent

UNITED STATES PATENTS

| | | |
|---|---|---|
| 230,695 | Detrick | Aug. 3, 1880 |
| 2,249,384 | Redin | July 8, 1941 |
| 2,281,665 | Brady | May 5, 1942 |
| 2,438,266 | Ewing | Mar. 23, 1948 |
| 2,458,036 | Veitch et al. | Jan. 4, 1949 |
| 2,518,826 | Slough | Aug. 15, 1950 |
| 2,551,266 | Hartman | May 1, 1951 |